US012555717B2

(12) United States Patent
Eda et al.

(10) Patent No.: US 12,555,717 B2
(45) Date of Patent: Feb. 17, 2026

(54) COIL COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Tokyo (JP); Takamasa Iwasaki, Tokyo (JP); Manabu Ohta, Tokyo (JP); Kenei Onuma, Tokyo (JP)

(73) Assignee: TDK CORPORATION, Tokyo (JP)

( * ) Notice: Subject to any disclaimer, the term of this patent is extended or adjusted under 35 U.S.C. 154(b) by 797 days.

(21) Appl. No.: 17/892,939

(22) Filed: Aug. 22, 2022

(65) Prior Publication Data

US 2023/0066655 A1 Mar. 2, 2023

(30) Foreign Application Priority Data

Aug. 26, 2021 (JP) ................................ 2021-137966

(51) Int. Cl.

*H01F 5/00* (2006.01)
*H01F 27/29* (2006.01)
*H01F 27/32* (2006.01)

(52) U.S. Cl.

CPC ......... *H01F 27/292* (2013.01); *H01F 27/324* (2013.01)

(58) Field of Classification Search

CPC .................................................... H01F 27/292
USPC ........................................................ 336/200
See application file for complete search history.

(56) References Cited

U.S. PATENT DOCUMENTS

2018/0122546 A1* 5/2018 Lee ......................... H01F 27/29
2018/0350500 A1* 12/2018 Matsuura ................ H01F 17/06
2019/0013148 A1* 1/2019 Ohkubo ................ H01F 17/045

FOREIGN PATENT DOCUMENTS

JP 2012-69781 A 4/2012
JP 2015-130472 A 7/2015
JP 2016-146431 A 8/2016
JP 2018-74144 A 5/2018
JP 2018-206950 A 12/2018
JP 2021-89936 A 6/2021

* cited by examiner

*Primary Examiner* — Ronald Hinson
(74) *Attorney, Agent, or Firm* — Oliff PLC

(57) ABSTRACT

In the coil component, since the contact area between the external terminal electrode and the element body is increased by the protrusion of the external terminal electrode, the external terminal electrode and the element body are more closely attached to each other. Therefore, the attachment strength between the external terminal electrode and the element body can be improved. Hence, it is possible to suppress peeling of the external terminal electrode from the element body.

10 Claims, 9 Drawing Sheets

COIL COMPONENT

TECHNICAL FIELD

The present disclosure relates to a coil component.

BACKGROUND

Well known in the art is a coil component having a coil in an element body thereof. Japanese Patent Application Publication No. 2015-130472 (Patent Document 1) discloses a coil component having four external terminals and provided with two coils in an element body thereof.

SUMMARY

In the above-described coil component, generally, external terminals electrically connected to end portions of the coil are provided on a surface of the element body. If the attachment strength between the element body and the external terminal is low, the external terminal peels off from the element body. Therefore, it is necessary to obtain sufficient attachment strength.

An object of the present disclosure is to provide a coil component in which attachment strength between the element body and the external terminal is improved.

A coil component according to one aspect of the present disclosure includes an element body having a first end surface and a second end surface parallel to each other, an insulating substrate provided in the element body and exposed at the first end surface, the insulating substrate having an exposed region exposed and extending along a first direction at the first end surface, a first coil portion provided on the insulating substrate, the first coil portion having a first end portion exposed at the first end surface, and a first external terminal provided on the first end surface, covering a part of the exposed region of the insulating substrate and the first end portion of the first coil portion. The first external terminal includes a first protrusion protruding toward the exposed region of the insulating substrate along the first direction.

In the above-described coil component, since the contact area between the first external terminal and the element body is increased by the first protrusion of the first external terminal, the first external terminal and the element body are more closely attached to each other. Therefore, it is possible to improve attachment strength between the first external terminal and the element body.

In the coil component according to another aspect of the present disclosure, the first external terminal includes the pair of first protrusions. The pair of the first protrusions protrude oppositely along the first direction.

In the coil component according to another aspect of the present disclosure, the first protrusion is offset from a center position of the first external terminal in a second direction orthogonal to the first direction at the first end surface.

In the coil component according to another aspect of the present disclosure, the first external terminal has an outer shape having a corner portion configured by a curved line.

In the coil component according to another aspect of the present disclosure, the insulating substrate includes a glass cloth.

In the coil component according to another aspect of the present disclosure, the insulating substrate in the exposed region has a surface roughness smaller than a surface roughness of the first end surface of the element body.

In the coil component according to another aspect of the present disclosure, the element body further includes a pair of magnetic layers the insulating substrate being sandwiched between the pair of magnetic layers in a second direction orthogonal to the first direction on the first end surface. The insulating substrate has a thickness thinner than a thickness of the magnetic layer with regard to the second direction.

In the coil component according to another aspect of the present disclosure, the element body is composed of a metal magnetic powder-containing resin.

In the coil component according to another aspect of the present disclosure, the element body further includes a mounting surface orthogonal to the first end surface and the second end surface, and a top surface facing the mounting surface. The first external terminal is apart from an edge of the top surface at the first end surface.

In the coil component according to another aspect of the present disclosure, the first external terminal includes a plurality of regions arranged in a second direction orthogonal to the first direction at the first end surface. The plurality of regions includes a first region having the first protrusion, a second region adjacent to the first region on the mounting surface side, and a third region adjacent to the first region on the top surface side. The second region has a length longer than a length of the third region with respect to the first direction.

In the coil component according to another aspect of the present disclosure, the insulating substrate protrudes from the element body at the first end surface.

In the coil component according to another aspect of the present disclosure, a second coil portion is provided on the insulating substrate, having a second end portion exposed at the first end surface. The second external terminal is provided on the first end surface adjacent to the first external terminal in the first direction, covers a part of the exposed region of the insulating substrate and the second end portion of the second coil portion. The second external terminal includes a second protrusion protruding toward the exposed region of the insulating substrate along the first direction. The first protrusion of the first external terminal and the second protrusion of the second external terminal are opposed to each other at the first end surface.

DETAILED DESCRIPTION

Figure 1:
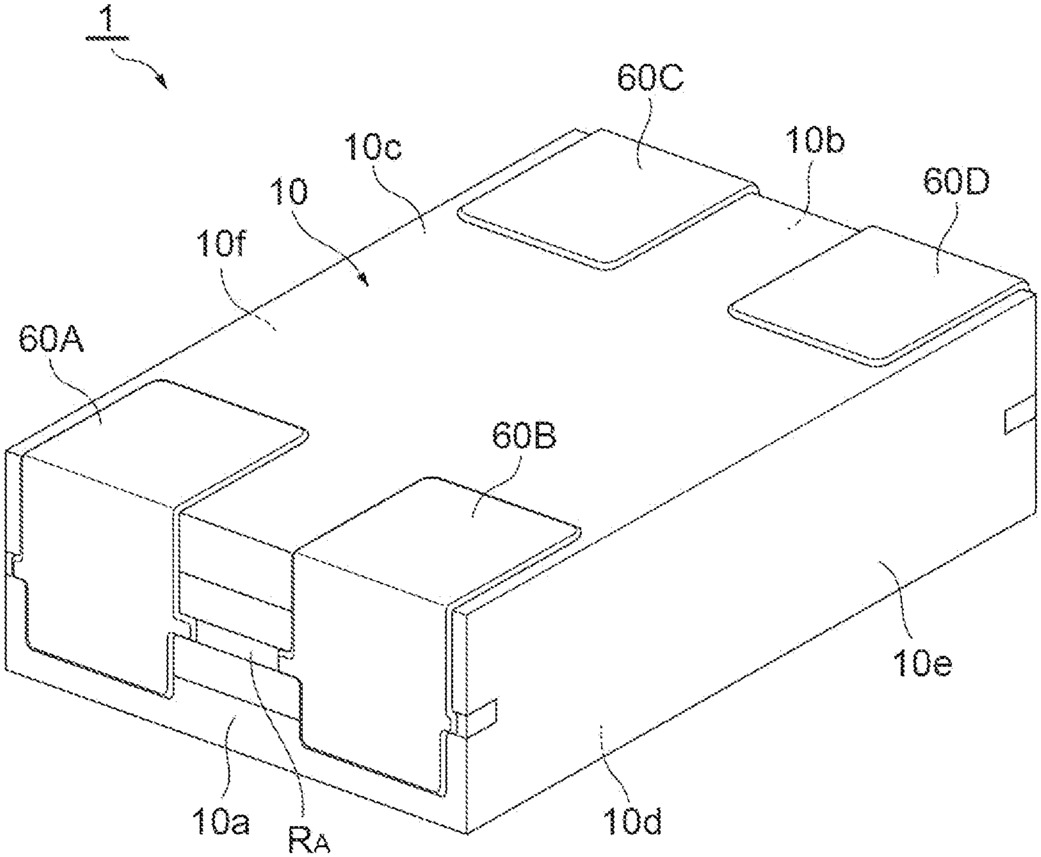
FIG. 1 is a schematic perspective view of the coil component according to one embodiment.

Hereinafter, embodiments of the present disclosure will be described in detail with reference to the accompanying drawings. In the description, the same reference numerals are used for the same elements or elements having the same functions, and redundant description will be omitted.

The coil component 1 according to one embodiment is, for example, a balun coil. The balun coil is used, for example, when a near field communication circuit (NFC circuit) is mounted on a cellular terminal. The balun coil performs conversion between an unbalanced signal of the antenna and a balanced signal of the NFC circuit, thereby realizing connection between the unbalanced circuit and the balanced circuit. The coil component 1 can be used for a common mode filter or a transformer.

As shown in FIG. 1, the coil component 1 includes an element body 10, a coil structure 20 embedded in the element body 10, and two pairs of external terminal electrodes 60A, 60B, 60C, and 60D provided on the element body 10.

The element body 10 has a rectangular parallelepiped outer shape and has six faces 10*a* to 10*f*. As an example, the element body 10 is designed to have dimensions of long side 2.0 mm, short side 1.25 mm, and height of 0.50 mm to 0.65 mm (as an example, 0.65 mm). Among the faces 10*a* to 10*f* of the element body 10, the end face 10*a* (first end face) and the end face 10*b* (second end face) are parallel to each other, the upper face 10*c* (mounting face) and the lower face 10*d* (top face) are parallel to each other, and the side face 10*e* and the side face 10*f* are parallel to each other. The lower face 10*d* faces the upper face 10*c*. The upper face 10*c*, the lower face 10*d*, the side face 10*e*, and the side face 10*f* are orthogonal to the end face 10*a* and the end face 10*b*. The upper face 10*c* of the element body 10 faces in a parallel manner a mounting face of a mounting substrate on which the coil component 1 is mounted. In the following description, a direction in which the side faces 10*e* and 10*f* face each other is also referred to as a widthwise direction of the element body 10, and a direction in which the upper face 10*c* and the lower face 10*d* face each other is also referred to as a height direction of the element body 10.

The element body 10 is made of a metal magnetic powder-containing resin 12 which is one type of magnetic material. The metal magnetic powder-containing resin 12 is a bound powder in which metal magnetic powder is bound by a binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline state, sendust, or the like. The binder resin is, for example, a thermosetting epoxy resin. In the present embodiment, the content of the metal magnetic powder in the bound powder is 80 to 92 vol % in terms of volume percent, and 95 to 99 wt % in terms of weight percent. From the viewpoint of magnetic properties, the content of the metal magnetic powder in the bound powder may be 85 to 92 vol % in terms of volume percent and 97 to 99 wt % in terms of weight percent. The magnetic powder of the metal magnetic powder-containing resin 12 may be a powder having one type of average particle diameter or a mixed powder having a plurality of types of average particle diameters.

Figure 2:
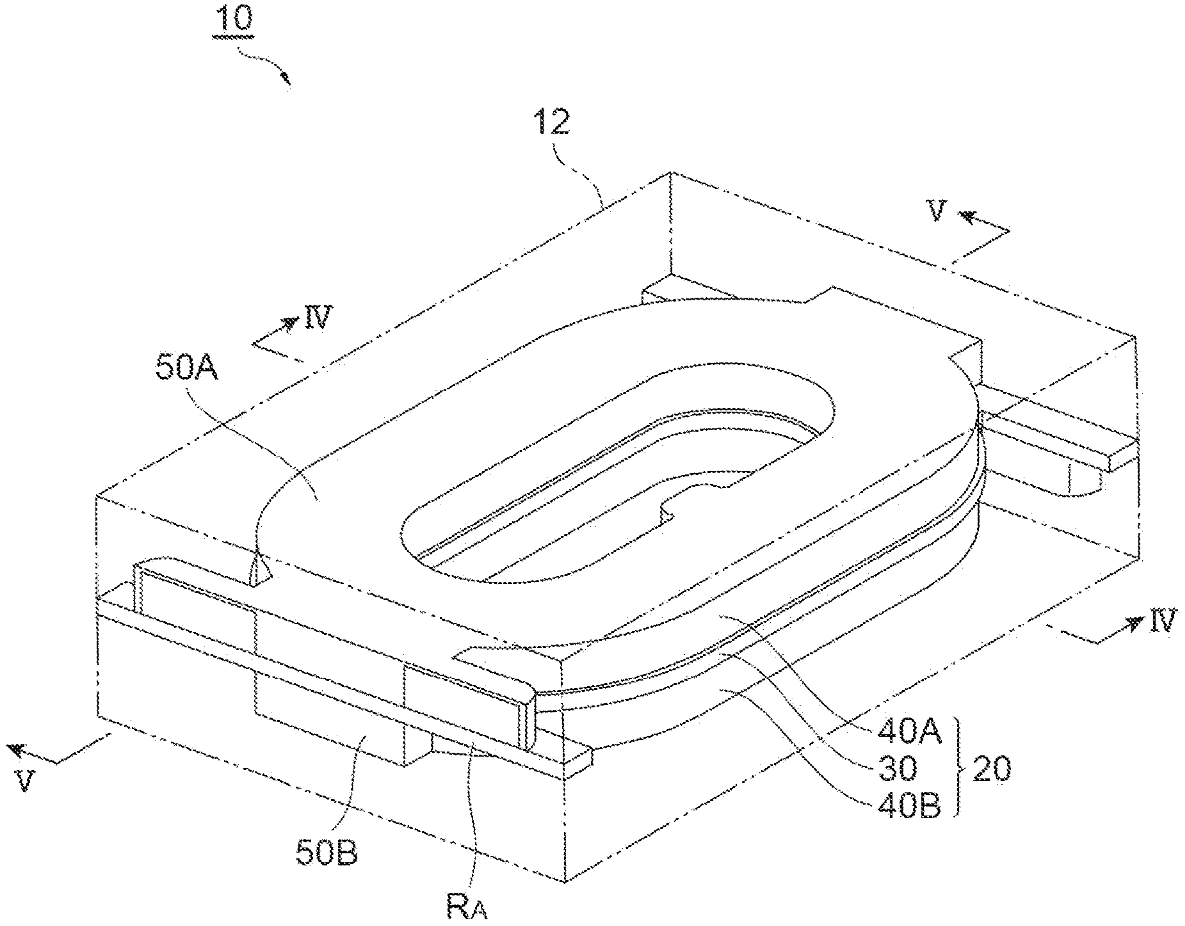
FIG. 2 is a view showing the inside of the coil component of FIG. 1.
Figure 3:
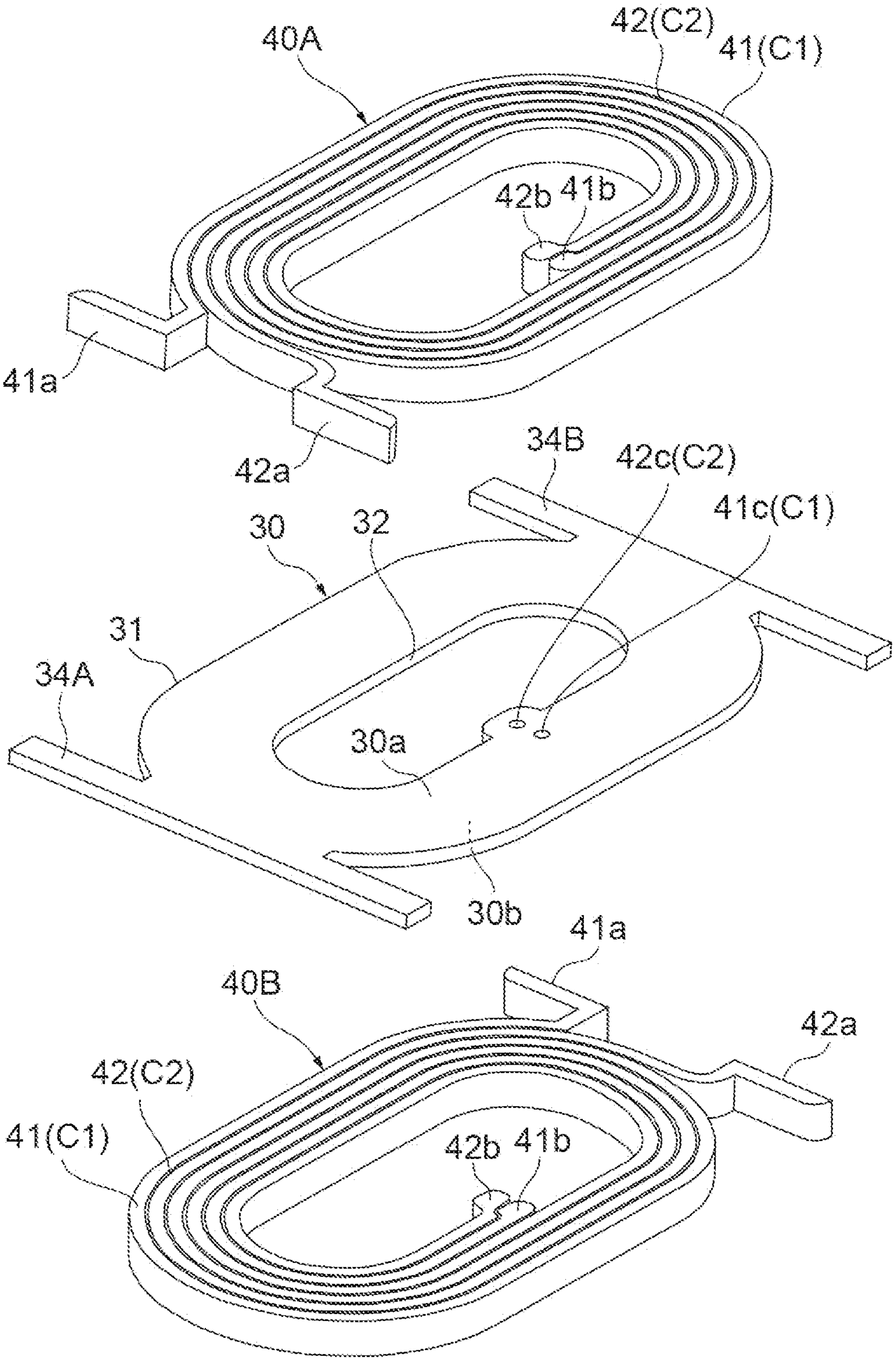
FIG. 3 is an exploded view of the coil shown in FIG. 2.
Figure 4:
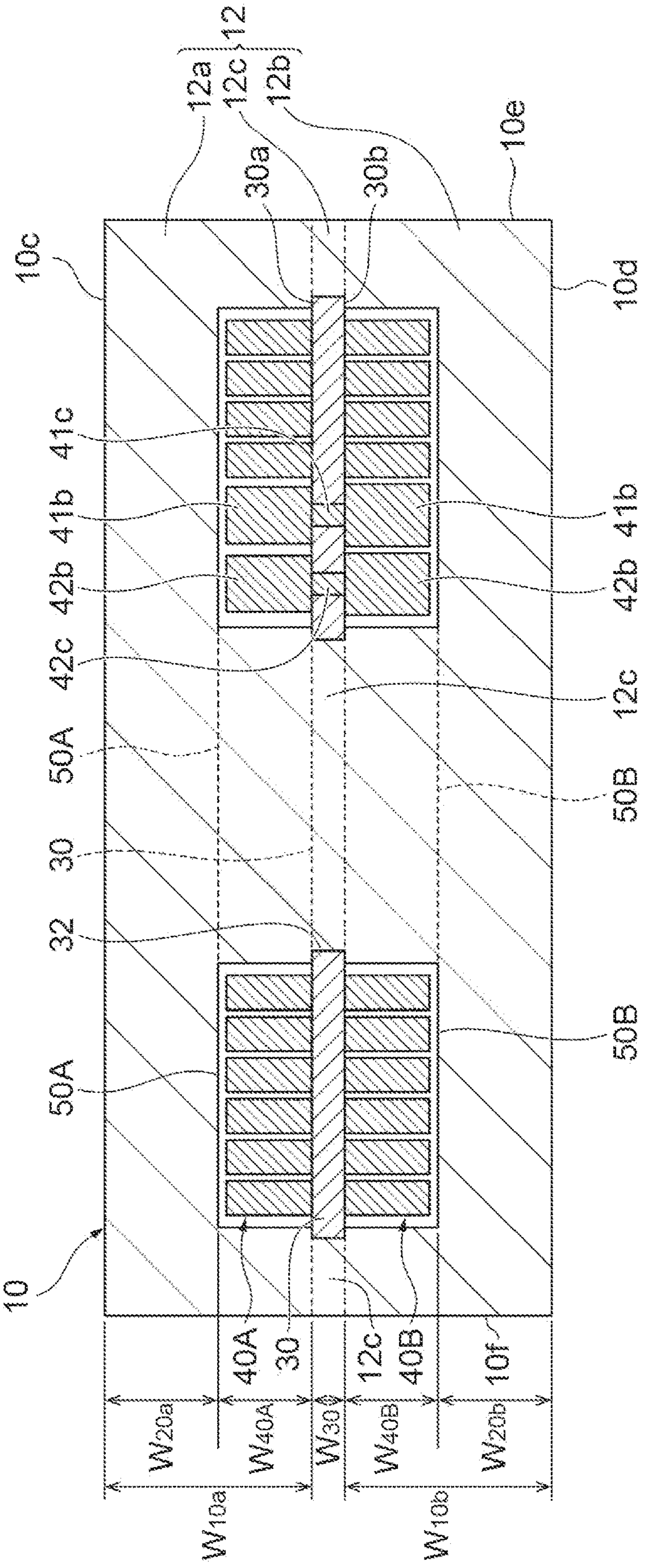
FIG. 4 is a cross-sectional view of the coil component taken along line IV-IV in FIG. 2.
Figure 5:
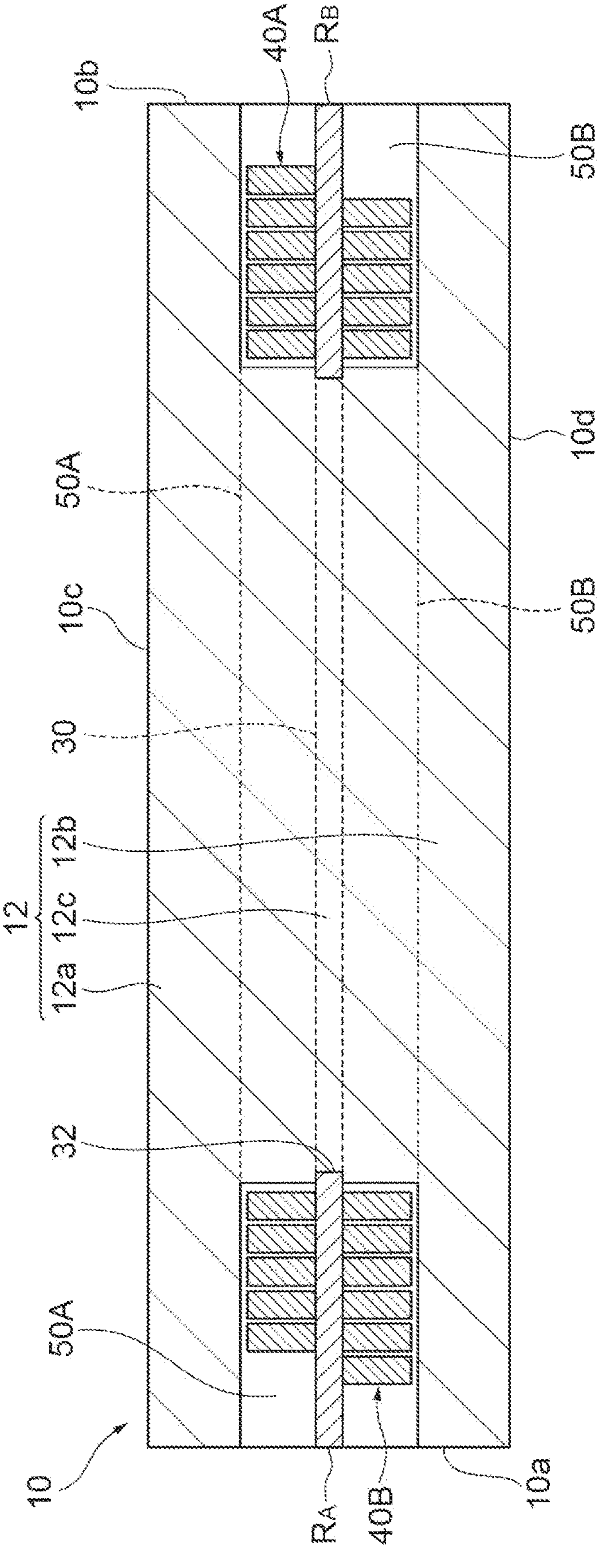
FIG. 5 is a cross-sectional view of the coil component taken along line V-V in FIG. 2.

As shown in FIGS. 2 and 3, the metal magnetic powder-containing resin 12 of the element body 10 integrally covers the coil structure 20 described later. Specifically, the metal magnetic powder-containing resin 12 covers the coil structure 20 from above and below and covers the outer periphery of the coil structure 20. The metal magnetic powder-containing resin 12 fills the inner peripheral region of the coil structure 20. As shown in FIGS. 4 and 5, the metal magnetic powder-containing resin 12 includes a pair of magnetic portions 12*a* and 12*b* (magnetic layers) between which the coil structure 20 is sandwiched in the height direction of the element body 10, and a plurality of magnetic portions 12*c* interposed between the magnetic portions 12*a* and 12*b*. As shown in FIG. 4, the maximum values $W_{10a}$ and $W_{10b}$ and the minimum values $W_{20a}$ and $W_{20b}$ of the thicknesses of the magnetic portions 12*a* and 12*b* are the thicknesses of the magnetic portions 12*a* and 12*b* along the height direction of the element body 10. The maximum values $W_{10a}$ and $W_{10b}$ of the thickness of the magnetic portions 12*a* and 12*b* are the thicknesses of the magnetic portions 12*a* and 12*b* at portions where the coil structures 40A and 40B described below are not interposed, for example, the thicknesses of the magnetic portions 12*a* and 12*b* at corners defined by the end faces 10*a* and 10*b* and the side faces 10*e* and 10*f*. The maximum value $W_{10a}$ of the thicknesses of the magnetic portions 12*a* and the maximum value $W_{10b}$ of the thicknesses of the magnetic portions 12*b* are, for example, 235 μm to 315 μm. In addition, the minimum values $W_{20a}$ and $W_{20b}$ of the thicknesses of the magnetic portions 12*a* and 12*b* are, for example, thicknesses of the magnetic portions 12*a* and 12*b* in a portion in which the coil structures 40A and 40B described below are interposed. The minimum value $W_{20a}$ of the thickness of the magnetic portions 12*a* and the minimum value $W_{20b}$ of the thickness of the magnetic portions 12*b* are, for example, 80 μm to 270 μm.

The coil structure 20 is embedded in the metal magnetic powder-containing resin 12. The coil structure 20 includes an insulating substrate 30, an upper coil structure 40A provided on an upper side of the insulating substrate 30, and a lower coil structure 40B provided on a lower side of the insulating substrate 30. The plurality of magnetic portions 12*c* described above are located in the same layer as the insulating substrate 30. The plurality of magnetic portions 12*c* fill a portion excluding the insulating substrate 30 in the layer in which the insulating substrate 30 is provided. Specifically, a part of the magnetic portion 12*c* fills an inner peripheral region of the insulating substrate 30, and another part of the magnetic portion 12*c* fills an outer peripheral region of the insulating substrate 30.

The insulating substrate 30 has a flat plate shape, extends between the end faces 10*a* and 10*b* of the element body 10, and is designed to be orthogonal to the end faces 10*a* and 10*b*. The insulating substrate 30 extends in parallel to the upper face 10*c* and the lower face 10*d* of the element body 10. As shown in FIG. 3, the insulating substrate 30 includes an elliptical ring-shaped coil forming portion 31 extending along the long-side direction of the element body 10, and a pair of frame portions 34A and 34B extending along the short-side direction of the element body 10. The coil forming portion 31 is between frame portions 34A and 34B. The insulating substrate 30 is exposed from the end face 10*a* of the element body 10 in the frame portion 34A, and the frame portion 34A forms an exposed region $R_A$ exposed in the end face 10*a*. Similarly, the insulating substrate 30 is exposed from the end face 10*b* of the element body 10 in the frame portion 34B, and the frame portion 34B forms an exposed region $R_B$ exposed in the end face 10*b*. An elliptical opening 32 extending along the long-side direction of the element body 10 is provided in a central portion of the coil forming portion 31.

The insulating substrate 30 is made of a nonmagnetic insulating material. In the present embodiment, the insulating substrate 30 has a configuration in which glass cloth is impregnated with epoxy resin. The resin configuring the insulating substrate 30 is not limited to the epoxy-based resin and may be a BT resin, polyimide, aramid, or the like.

The insulating substrate 30 may be made of ceramic or glass. The insulating substrate 30 may be made of a mass-produced printed circuit board material. The insulating substrate 30 may be made of a plastic material used for a BT printed circuit board, an FR4 printed circuit board, or an FR5 printed circuit board.

As shown in FIG. 4, the thickness $W_{30}$ of the insulating substrate 30 can be designed in a range of, for example, 10 μm to 60 μm. The thickness $W_{30}$ of the insulating substrate 30 is, for example, 25 μm. The thickness $W_{30}$ of the insulating substrate 30 can be designed to be thinner than, for example, the minimum value $W_{20a}$ of the thickness of the magnetic portion 12*a* and the minimum value $W_{20b}$ of the thickness of the magnetic portion 12*b*. The sum of the maximum value $W_{10a}$ of the thicknesses of the magnetic portions 12*a*, the maximum value $W_{10b}$ of the thicknesses of the magnetic portions 12*b*, and the thicknesses $W_{30}$ of the insulating substrates 30 is equal to the height of the element body 10.

The upper coil structure 40A is provided on the upper face 30*a* of the coil forming portion 31 of the insulating substrate 30. As shown in FIGS. 2 and 3, the upper coil structure 40A includes a first planar coil 41, a second planar coil 42, and an upper insulator 50A. The first planar coil 41 and the second planar coil 42 are wound adjacent to each other in parallel on the upper face 30*a* of the insulating substrate 30. In this embodiment, the thickness $W_{40A}$ of the upper coil structure 40A is designed to be thicker than the thickness $W_{30}$ of the insulating substrate 30. As shown in FIG. 4, the thickness $W_{40A}$ of the upper coil structure 40A is, for example, 90 μm to 175 μm, and is 110 μm as an example. The sum of the minimum value $W_{20a}$ of the thickness of the magnetic portion 12*a* and the thickness $W_{40A}$ of the coil structure 40A is the same as the maximum value $W_{10a}$ of the magnetic portion 12*a*.

The first planar coil 41 is a substantially oval spiral air-core coil wound around the opening 32 of the coil forming portion 31 in the same layer on the upper face 30*a* of the insulating substrate 30. The number of turns of the first planar coil 41 may be one or a plurality of turns. In the present embodiment, the number of turns of the first planar coil 41 is three to four. The first planar coil 41 has an outer end portion 41*a* and an inner end portion 41*b*. The outer end portion 41*a* is provided on the frame portion 34A and is exposed from the end face 10*a* of the element body 10. The inner end portion 41*b* is provided at the edge of the opening 32. The insulating substrate 30 is provided with a first through conductor 41*c* extending in the thickness direction of the insulating substrate 30 at a position overlapping the inner end portion 41*b* of the first planar coil 41. The first planar coil 41 is made of Cu, for example, and can be formed by electrolytic plating.

Similarly to the first planar coil 41, the second planar coil 42 is a substantially elliptical spiral air-core coil wound around the opening 32 of the coil forming portion 31 in the same layer on the upper face 30*a* of the insulating substrate 30. The second planar coil 42 is wound so as to be adjacent to the first planar coil 41 on the inner peripheral side of the first planar coil 41. The number of turns of the second planar coil 42 may be one or a plurality of turns. In the present embodiment, the number of turns of the second planar coil 42 is the same as the number of turns of the first planar coil 41. The second planar coil 42 has an outer end portion 42*a* and an inner end portion 42*b*. Similarly to the outer end portion 41*a* of the first planar coil 41, the outer end portion 42*a* of the second planar coil 42 is provided in the frame portion 34A and is exposed from the end face 10*a* of the element body 10. The inner end portion 42*b* of the second planar coil 42 is provided at the edge of the opening 32 and is adjacent to the inner end portion 41*b* of the first planar coil 41. The insulating substrate 30 is provided with a second through conductor 42*c* extending in the thickness direction of the insulating substrate 30 at a position overlapping with the inner end portion 42*b* of the second planar coil 42. Similarly to the first planar coil 41, the second planar coil 42 is made of Cu, for example, and can be formed by electrolytic plating.

Figure 6:
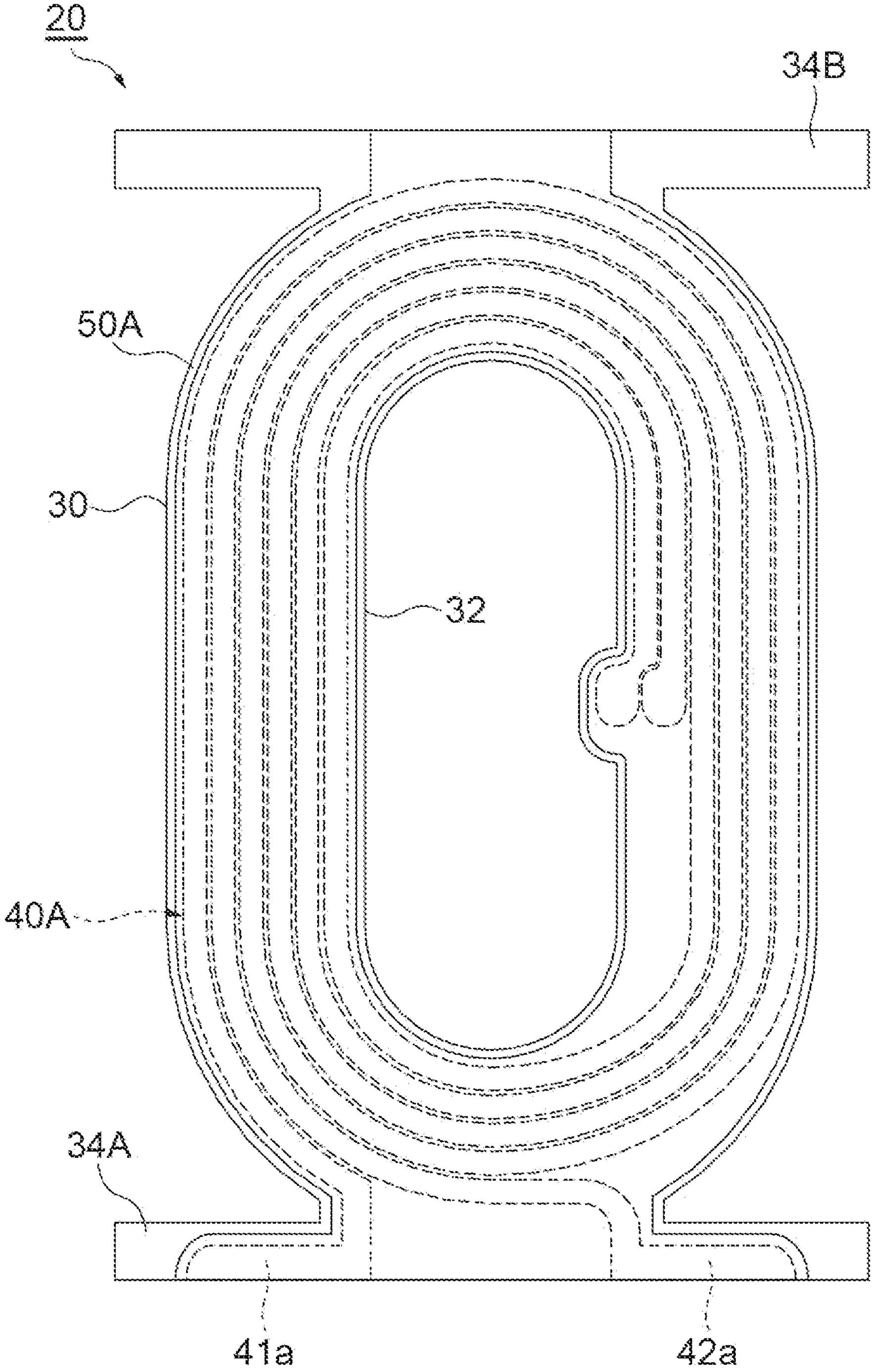
FIG. 6 is a plan view of the coil shown in FIG. 2.

The upper insulator 50A is provided on the upper face 30*a* of the insulating substrate 30 and is a thick-film resist patterned by known photolithography. The upper insulator 50A defines a plating growth region of the first planar coil 41 and the second planar coil 42. In the present embodiment, as shown in FIG. 4, the upper insulator 50A integrally covers the first planar coil 41 and the second planar coil 42, and more specifically, covers side faces and upper faces of the first planar coil 41 and the second planar coil 42. As shown in FIGS. 5 and 6, a portion of the upper insulator 50A extends from the inside of the element body 10 to the end face 10*a* of the element body 10 through between the outer end portion 41*a* and the outer end portion 42*a*, and is exposed at the end face 10*a*. Further, as shown in FIGS. 5 and 6, a part of the upper insulator 50A extends from the inside of the element body 10 to the end face 10*b* along the upper face 30*a* and is exposed at the end face 10*b*. The upper insulator 50A is thicker than the first planar coil 41 and the second planar coil 42. The upper insulator 50A is made of, for example, epoxy.

The lower coil structure 40B is provided on the lower face 30*b* of the coil forming portion 31 of the insulating substrate 30. As shown in FIGS. 2 and 3, the lower coil structure 40B includes a first planar coil 41, a second planar coil 42, and a lower insulator 50B. The first planar coil 41 and the second planar coil 42 are wound in parallel and adjacent to each other on the lower face 30*b* of the insulating substrate 30. In the present embodiment, the thickness $W_{40B}$ of the lower coil structure 40B is designed to be thicker than the thickness $W_{30}$ of the insulating substrate 30. As shown in FIG. 4, the thickness $W_{40B}$ of the lower coil structure 40B is, for example, 90 μm to 175 μm, and is 110 μm as an example. The sum of the minimum value $W_{20b}$ of the thickness of the magnetic portion 12*b* and the thickness $W_{40B}$ of the lower coil structure 40B is the same as the maximum value $W_{10b}$ of the magnetic portion 12*b*.

The first planar coil 41 and the second planar coil 42 of the lower coil structure 40B are symmetrical to the first planar coil 41 and the second planar coil 42 of the upper coil structure 40A. Specifically, the first planar coil 41 and the second planar coil 42 of the lower coil structure body 40B have shapes obtained by inverting the first planar coil 41 and the second planar coil 42 of the upper coil structure 40A around axis parallel to the short sides of the element body 10.

The outer end portion 41*a* of the first planar coil 41 of the lower coil structure 40B is provided in the frame portion 34B and is exposed from the end face 10*b* of the element body 10. The inner end portion 41*b* of the first planar coil 41 of the lower coil structure 40B overlaps the first through conductor 41*c* provided in the insulating substrate 30. Therefore, the inner end portion 41*b* of the first planar coil 41 of the lower coil structure 40B is electrically connected to the inner end portion 41*b* of the first planar coil 41 of the upper coil structure 40A via the first through conductor 41*c*. The first planar coil 41 of the lower coil structure 40B is made of Cu, for example, and can be formed by electrolytic plating.

The outer end portion 42*a* of the second planar coil 42 of the lower coil structure 40B is provided in the frame portion 34B and is exposed from the end face 10*b* of the element body 10. The inner end portion 42*b* of the second planar coil 42 of the lower coil structure 40B overlaps the second through conductor 42*c* provided in the insulating substrate 30. Therefore, the inner end portion 42*b* of the second planar coil 42 of the lower coil structure 40B is electrically connected to the inner end portion 42*b* of the second planar coil 42 of the upper coil structure 40A via the second through conductor 42*c*. The second planar coil 42 of the lower coil structure 40B is made of, for example, Cu, and can be formed by electrolytic plating.

The lower insulator 50B is provided on the lower face 30*b* of the insulating substrate 30 and is a thick-film resist patterned by known photolithography. Similarly to the upper insulator 50A, the lower insulator 50B defines a plating growth region for the first planar coil 41 and the second planar coil 42. In the present embodiment, as shown in FIG. 4, the lower insulator 50B integrally covers the first planar coil 41 and the second planar coil 42, and more specifically, covers side faces and upper faces of the first planar coil 41 and the second planar coil 42. Similarly to the upper insulator 50A, a portion of the lower insulator 50B extends from the inside of the element body 10 to the end face 10*b* of the element body 10 through between the outer end portion 41*a* and the outer end portion 42*a*, and is exposed at the end face 10*b*. A portion of the lower insulator 50B extends along the lower face 30*b* from the inside of the element body 10 to the end face 10*a* and is exposed at the end face 10*a*. The lower insulator 50B is thicker than the first planar coil 41 and the second planar coil 42. The lower insulator 50B may have the same thickness as the upper insulator 50A. The lower insulator 50B is made of, for example, epoxy.

The element body 10 includes a pair of coil portions C1 and C2 configuring a double coil structure. The first coil portion C1 includes the first planar coil 41 of the upper coil structure 40A provided on the upper face 30*a* of the insulating substrate 30, the first planar coil 41 of the lower coil structure 40B provided on the lower face 30*b* of the insulating substrate 30, and the first through conductor 41*c* connecting the first planar coils 41 on both faces. In the first coil portion C1, the outer end portion 41*a* of the first planar coil 41 of the upper coil structure 40A configures a first end portion, and the outer end portion 41*a* of the first planar coil 41 of the lower coil structure 40B configures a second end portion. The second coil portion C2 is configured to the second planar coil 42 of the upper coil structure 40A provided on the upper face 30*a* of the insulating substrate 30, the second planar coil 42 of the lower coil structure 40B provided on the lower face 30*b* of the insulating substrate 30, and the second through conductor 42*c* connecting the second planar coils 42 on both faces. In the second coil portion C2, the outer end portion 42*a* of the second planar coil 42 of the upper coil structure 40A configures a first end portion, and the outer end portion 42*a* of the second planar coil 42 of the lower coil structure 40B configures a second end portion.

The two pairs of external terminal electrodes 60A, 60B, 60C, and 60D are provided in pairs on end faces 10*a* and 10*b* of the element body 10 that are parallel to each other.

Figure 7:
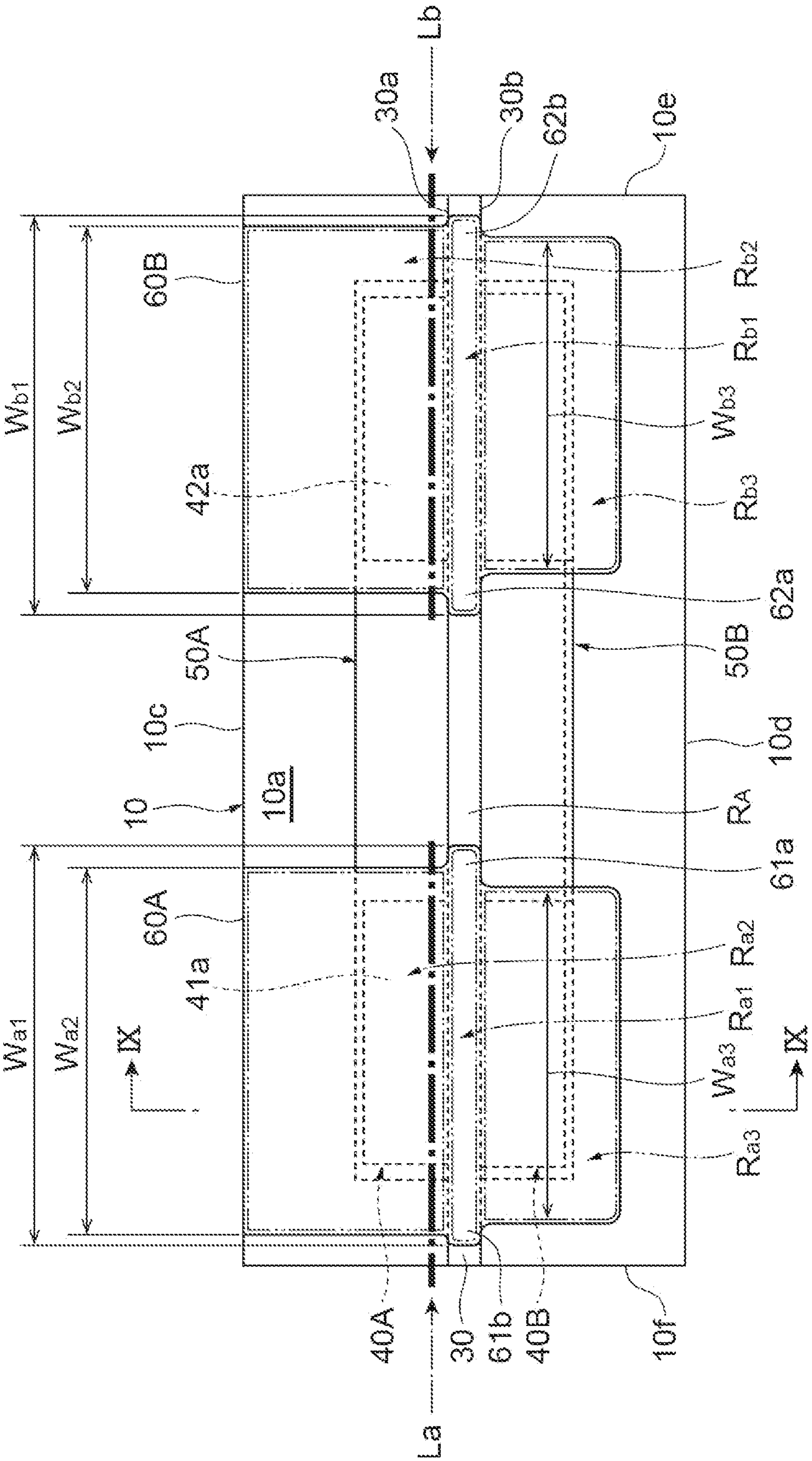
FIG. 7 is a view showing one end surface of the element body of the coil component shown in FIG. 1.

Of the pair of external terminal electrodes 60A and 60B provided on the end face 10*a*, the external terminal electrode 60A (first external terminal) is connected to the outer end portion 41*a* of the first planar coil 41 of the upper coil structure 40A and covers the outer end portion 41*a*. The external terminal electrode 60B (second external terminal) is connected to the outer end portion 42*a* of the second planar coil 42 of the upper coil structure 40A and covers the outer end portion 42*a*. As shown in FIG. 7, the pair of external terminal electrodes 60A and 60B are adjacent to each other in the widthwise direction of the element body 10 and are provided so as to be separated from each other. When viewed from the end face 10*a* side, the external terminal electrode 60A is biased toward the side face 10*f* side and covers the end face 10*a* up to near the edge of the side face 10*f*. The external terminal electrode 60A is apart from the edge of the lower face 10*d* in the end face 10*a*. The external terminal electrode 60B is biased to the side face 10*e* side, and covers the end face 10*a* up to near the edge of the side face 10*e*. The external terminal electrode 60B is apart from the edge of the lower face 10*d* in the end face 10*a*.

Figure 8:
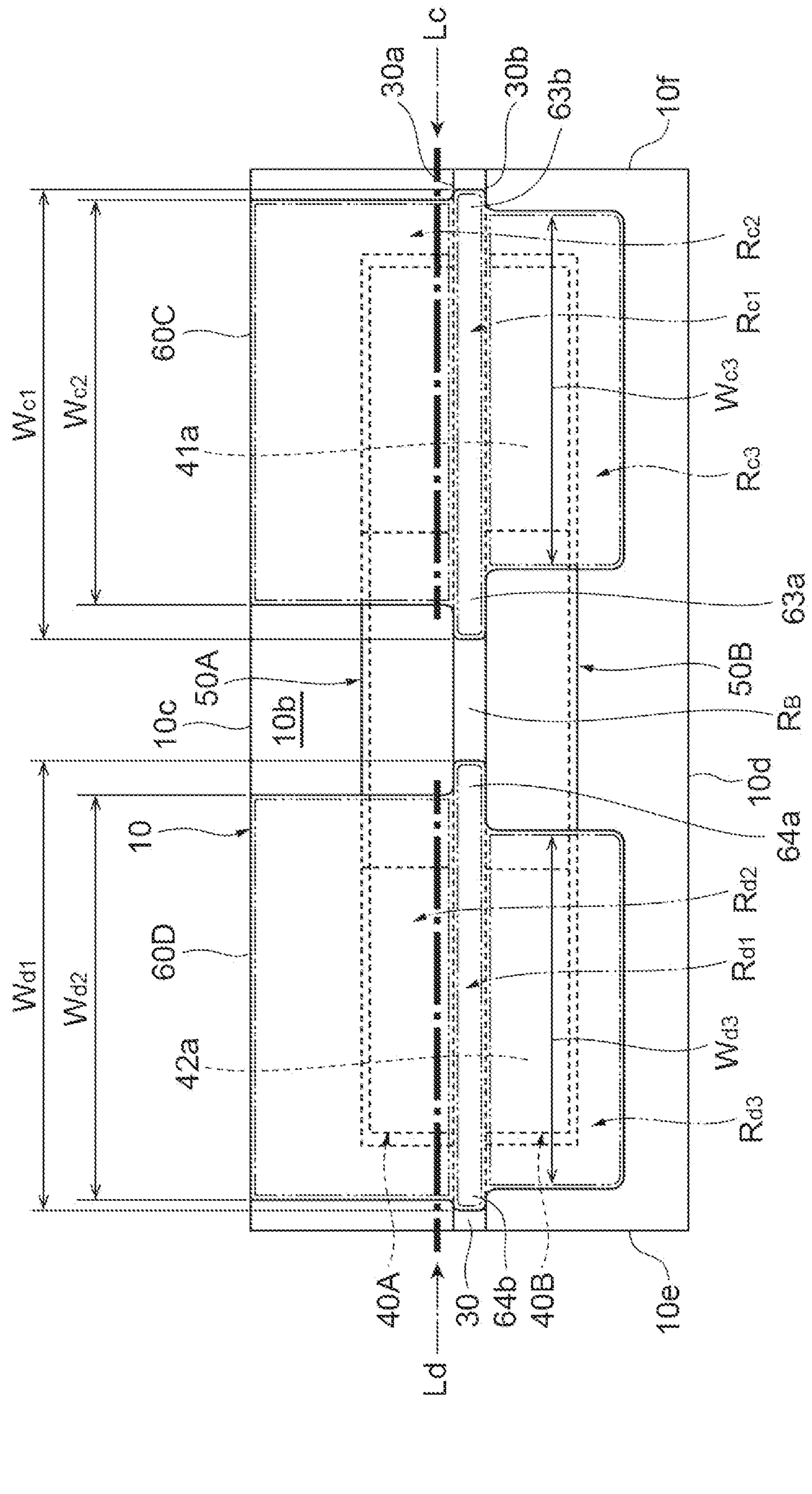
FIG. 8 is a view showing the other end surface of the element body of the coil component shown in FIG. 1.

Of the pair of external terminal electrodes 60C and 60D provided on the end face 10*b*, the external terminal electrode 60C is connected to the outer end portion 41*a* of the first planar coil 41 of the lower coil structure 40B, and the external terminal electrode 60D is connected to the outer end portion 42*a* of the second planar coil 42 of the lower coil structure 40B. As shown in FIG. 8, the pair of external terminal electrodes 60C and 60D are adjacent to each other in the widthwise direction of the element body 10 and are provided so as to be separated from each other. The external terminal electrode 60C is biased to the side face 10*f* side and covers the end face 10*b* up to near the edge of the side face 10*f*. The external terminal electrode 60C is apart from the edge of the lower face 10*d* in the end face 10*b*. The external terminal electrode 60D is biased to the side face 10*e* side, and covers the end face 10*b* up to near the edge of the side face 10*e*. The external terminal electrode 60D is apart from the edge of the lower face 10*d* in the end face 10*b*.

The external terminal electrode 60A of the end face 10*a* and the external terminal electrode 60C of the end face 10*b* are provided at positions corresponding to each other in the long-side direction of the element body 10. Similarly, the external terminal electrode 60B on the end face 10*a* and the external terminal electrode 60D on the end face 10*b* are provided at positions corresponding to each other in the long-side direction of the element body 10.

Each of the external terminal electrodes 60A, 60B, 60C, and 60D is bent in an L shape and continuously covers the end faces 10*a* and 10*b* and the upper face 10*c*. In the present embodiment, the external terminal electrodes 60A, 60B, 60C, and 60D are made of resinous electrodes. For example, the external terminal electrodes 60A, 60B, 60C, and 60D made of resins containing Ag powder.

Next, the configuration of the end face 10*a* of the element body 10 will be described with reference to FIG. 7.

As described above, the insulating substrate 30 is exposed in the exposed region $R_A$ on the end face 10*a* of the element body 10. The exposed region $R_A$ extends between the side faces 10*e* and 10*f* of the element body 10 along a first direction parallel to the upper face 10*c* and the lower face 10*d* in the end face 10*a*. The first direction is the widthwise direction of the element body 10 in the end face 10*a*. The exposed region $R_A$ is located at a substantially central position of the end face 10*a* with respect to a second direction orthogonal to the first direction in the end face 10*a* of the element body 10 (that is, the second direction is a facing direction of the upper face 10*c* and the lower face 10*d*, or a height direction of the element body 10 in the end face 10*a*).

The external terminal electrode 60A is located on the side face 10*f* side of the end face 10*a* and covers a part of the exposed region $R_A$. The external terminal electrode 60A has a substantially rectangular shape when viewed from the end face 10*a* side. More specifically, the external terminal electrode 60A has a rectangular shape having corner portions formed by curves (that is, having rounded corners). Therefore, the outer shape of the external terminal electrode 60A does not have a sharp corner portion. More specifically, the external terminal electrode 60A is configured to three regions arranged in the second direction. Each of the three regions has a rectangular shape extending in the first direction. Of the three regions, the first region $R_{a1}$ is located on the exposed region $R_A$. The second region $R_{a2}$ is adjacent to the first region $R_{a1}$ on the upper face 10*c* side. The third region $R_{a3}$ is adjacent to the first region $R_{a1}$ on the lower face 10*d* side. The length of the first region $R_{a1}$ along the first direction (i.e., the width $W_{a1}$ of the first region $R_{a1}$) is longer than the length of the second region $R_{a2}$ along the first direction (i.e., the width $W_{a1}$ of the second region $R_{a2}$). Furthermore, the length of the second region $R_{a2}$ is longer than the length of the third region $R_{a3}$ along the first direction (i.e., the width $W_{a3}$ of the third region $R_{a3}$). The length $W_{a1}$ of the first region $R_{a1}$ is, for example, 500 μm to 600 μm, the length $W_{a2}$ of the second region $R_{a2}$ is, for example, 400 μm to 500 μm, and the length $W_{a3}$ of the third region $R_{a3}$ is, for example, 300 μm to 400 μm. When the second region $R_{a2}$ is wide, the solder formation region in the vicinity of the mounting substrate is enlarged at the time of solder mounting, so that the mounting strength and electrical connection are stabilized.

The first region $R_{a1}$ located on the exposed region $R_A$ is located substantially at the center of the end face 10*a* in the second direction. The second region $R_{a2}$ of the external terminal electrode 60A reaches the edge of the upper face 10*c* in the end face 10*a*. On the other hand, the third region $R_{a3}$ of the external terminal electrode 60A does not reach the edge of the lower face 10*d* in the end face 10*a*, and the lower end of the third region $R_{a3}$ is apart from the edge of the lower face 10*d* along the second direction. Therefore, the height of the second region $R_az$ along the second direction is higher than the height of the third region $R_{a3}$, and the center position La of the external terminal electrode 60A in the second direction is located closer to the upper face 10*c* than the center position of the end face 10*a*. In other words, the first region $R_{a1}$ of the external terminal electrode 60A is biased toward the lower face 10*d* side with respect to the center position La of the external terminal electrode 60A in the second direction.

As described above, the first region $R_{a1}$ of the external terminal electrode 60A is longer in the first direction than the second region $R_{a2}$ and the third region $R_{a3}$. Specifically, a portion of the first region $R_{a1}$ of the external terminal electrode 60A that is not in contact with the second region $R_{a2}$ and the third region $R_{a1}$ configures a pair of protrusions 61*a* and 61*b* (first protrusions) that protrude in the first direction compared to the second region $R_{a2}$ and the third region $R_{a1}$. The pair of protrusions 61*a* and 61*b* protrude toward the exposed region $R_A$ of the insulating substrate 30 along the first direction. The pair of protrusions 61*a* and 61*b* protrude oppositely along the first direction. Specifically, the protrusion 61*a* protrudes in a direction approaching the side face 10*e* along the first direction (rightward in FIG. 7). The protrusion 61*b* protrudes in a direction approaching the side face 10*f* along the first direction (leftward in FIG. 7). In the present embodiment, since the first region $R_{a1}$ is biased toward the lower face 10*d* side with respect to the center position La of the external terminal electrode 60A in the second direction, the protrusions 61*a* and 61*b* of the first region $R_{a1}$ are also biased toward the lower face 10*d* side with respect to the center position La of the external terminal electrode 60A in the second direction. Each of the protrusion lengths of the protrusions 61*a* and 61*b* is, for example, 10 μm to 100 μm.

The external terminal electrode 60B is located on the side face 10*e* side of the end face 10*a* and covers a part of the exposed region $R_A$. The external terminal electrode 60B has a substantially rectangular shape when viewed from the end face 10*a* side. Specifically, the external terminal electrode 60B has a rectangular shape having corner portions formed by curves (that is, having rounded corners). Therefore, the outer shape of the external terminal electrode 60B does not have a sharp corner. More specifically, similarly to the external terminal electrode 60A, the external terminal electrode 60B includes three regions arranged in the second direction. Each of the three regions has a rectangular shape extending in the first direction. Of the three regions, the first region $R_{b1}$ is located on the exposed region $R_A$. The second region $R_{b2}$ is adjacent to the first region $R_{b1}$ on the upper face 10*c* side. The third region $R_{b3}$ is adjacent to the first region $R_{b1}$ on the lower face 10*d* side. The length of the first region $R_{b1}$ along the first direction (i.e., the width $W_{b1}$ of the first region $R_{b1}$) is longer than the length of the second region $R_{b2}$ along the first direction (i.e., the width $W_{b2}$ of the second region $R_{b2}$). Furthermore, the length $W_{b2}$ of the second region $R_{b2}$ is longer than the length of the third region $R_{b3}$ along the first direction (i.e., the width $W_{b3}$ of the third region $R_{b3}$). The length $W_{b1}$ of the first region $R_{b1}$ is, for example, 500 μm to 600 μm, the length $W_{b2}$ of the second region $R_{b2}$ is, for example, 400 μm to 500 μm, and the length $W_{b3}$ of the third region $R_{b3}$ is, for example, 300 μm to 400 μm.

The first region $R_{b1}$ located on the exposed region $R_A$ is located substantially at the center of the end face 10*a* in the second direction. The second region $R_{b2}$ of the external terminal electrode 60B reaches the edge of the upper face 10*c* in the end face 10*a*. On the other hand, the third region $R_{b3}$ of the external terminal electrode 60B does not reach the edge of the lower face 10*d* in the end face 10*a*, and the lower end of the third region $R_{b3}$ is apart from the edge of the lower face 10*d* along the second direction. Therefore, the height of the second region $R_{b2}$ along the second direction is higher than the height of the third region $R_{b3}$, and the center position Lb of the external terminal electrode 60B in the second direction is located closer to the upper face 10*c* than the center position of the end face 10*a*. In other words, the first region $R_{b1}$ of the external terminal electrode 60B is biased toward the lower face 10*d* side with respect to the center position Lb of the external terminal electrode 60B in the second direction. In the present embodiment, the center position La of the external terminal electrode 60A and the center position Lb of the external terminal electrode 60B are at the same height position in the second direction.

As described above, the first region $R_{b1}$ of the external terminal electrode 60B is longer in the first direction than the second region $R_{b2}$ and the third region $R_{b3}$. Specifically, a portion of the first region $R_{b1}$ of the external terminal electrode 60B that is not in contact with the second region $R_{b2}$ and the third region $R_{b3}$ configures a pair of protrusions 62*a* and 62*b* (second protrusions) that protrude in the first direction compared to the second region $R_{b2}$ and the third region $R_{b3}$. The pair of protrusions 62*a* and 62*b* protrude toward the exposed region $R_A$ of the insulating substrate 30 along the first direction. The pair of protrusions 62*a* and 62*b* protrude oppositely along the first direction. Specifically, the protrusion 62*a* protrudes in a direction approaching the side face 10*f* along the first direction (leftward in FIG. 7). The protrusion 62*b* protrudes in a direction approaching the side face 10*e* along the first direction (rightward in FIG. 7). In the present embodiment, since the first region $R_{b1}$ is biased toward the lower face 10*d* side from the center position Lb of the external terminal electrode 60B in the second direction, the protrusions 62*a* and 62*b* of the first region $R_{b1}$ are also biased toward the lower face 10*d* side from the center position Lb of the external terminal electrode 60B in the second direction. In addition, the protrusion 62*a* of the external terminal electrode 60B and the protrusion 61*a* of the external terminal electrode 60A face each other in the exposed region $R_A$ of the end face 10*a*. Specifically, the protrusion 62*a* of the external terminal electrode 60B protrudes in the exposed region $R_A$ so as to approach the external terminal electrode 60A. The protrusion 61*a* of the external terminal electrode 60A protrudes in the exposed region $R_A$ so as to approach the external terminal electrode 60B. Each of the protrusion lengths of the protrusions 62*a* and 62*b* is, for example, 10 μm to 100 μm.

Next, the configuration of the end face 10*b* of the element body 10 will be described with reference to FIG. 8.

The insulating substrate 30 is exposed in the exposed region $R_B$ on the end face 10*b* of the element body 10. As shown in FIG. 8, the exposed region $R_B$ extends between the side faces 10*e* and 10*f* of the element body 10 along the first direction parallel to the upper face 10*c* and the lower face 10*d* on the end face 10*b* (that is, the widthwise direction of the element body 10 on the end face 10*b*) in the same manner as the exposed region $R_A$ on the end face 10*a*. The exposed region $R_B$ is located at a substantially central position of the end face 10*b* of the element body 10 with respect to a second direction orthogonal to the first direction in the end face 10*b* of the element body 10 (that is, the second direction is a facing direction of the upper face 10*c* and the lower face 10*d*, or a height direction of the element body 10 in the end face 10*b*).

The external terminal electrode 60C is located on the side face 10*f* side of the end face 10*b* and covers a part of the exposed region $R_B$. The external terminal electrode 60C has a substantially rectangular shape when viewed from the end face 10*b* side. More specifically, the external terminal electrode 60C has a rectangular shape having corner portions formed by curves (that is, having rounded corners). Therefore, the outer shape of the external terminal electrode 60C does not have a sharp corner. More specifically, the external terminal electrode 60C is configured to three regions arranged in the second direction. Each of the three regions has a rectangular shape extending in the first direction. Of the three regions, the first region $R_{c1}$ is located on the exposed region $R_B$. The second region $R_{c2}$ is adjacent to the first region $R_{c1}$ on the upper face 10*c* side. The third region $R_{c3}$ is adjacent to the first region $R_{c1}$ on the lower face 10*d* side. The length of the first region $R_{c1}$ along the first direction (i.e., the width $W_{c1}$ of the first region $R_{c1}$) is longer than the length of the second region $R_{c2}$ along the first direction (i.e., the width $W_{c2}$ of the second region $R_{c2}$). Furthermore, the length $W_{c2}$ of the second region $R_{c2}$ is longer than the length $W_{c3}$ of the third region $R_{c3}$ along the first direction (i.e., the width $W_{c3}$ of the third region $R_{c3}$). The lengths $W_{c1}$ of the first regions $R_{c1}$ is, for example, 500 μm to 600 μm, the lengths $W_{c2}$ of the second regions $R_{c2}$ is, for example, 400 μm to 500 μm, and the length $W_{c3}$ of the third region $R_{c3}$ is, for example, 300 μm to 400 μm.

The first region $R_{c1}$ located on the exposed region $R_B$ is located substantially at the center of the end face 10*b* in the second direction. The second region $R_{c2}$ of the external terminal electrode 60C reaches the edge of the upper face 10*c* in the end face 10*b*. On the other hand, the third region $R_{c3}$ of the external terminal electrode 60C does not reach the edge of the lower face 10*d* in the end face 10*b*, and the lower end of the third region $R_{c3}$ is apart from the edge of the lower face 10*d* along the second direction. Therefore, the height of the second region $R_{c2}$ along the second direction is higher than the height of the third region $R_{c3}$, and the center position Lc of the external terminal electrode 60C in the second direction is located closer to the upper face 10*c* than the center position of the end face 10*b*. In other words, the first region $R_{c1}$ of the external terminal electrode 60C is biased toward the lower face 10*d* side with respect to the center position Lc of the external terminal electrode 60C in the second direction.

As described above, the first region $R_{c1}$ of the external terminal electrode 60C is longer in the first direction than the second region $R_{c2}$ and the third region $R_{c3}$. Specifically, a portion of the first region $R_{c1}$ of the external terminal electrode 60C that is not in contact with the second region $R_{c2}$ and the third region $R_{c3}$ configures a pair of protrusions 63*a* and 63*b* that protrude in the first direction compared to the second region $R_{c2}$ and the third region $R_{c3}$. The pair of protrusions 63*a* and 63*b* protrude toward the exposed region $R_B$ of the insulating substrate 30 along the first direction. The pair of protrusions 63*a* and 63*b* protrude oppositely along the first direction. Specifically, the protrusion 63*a* protrudes in a direction approaching the side face 10*e* along the first direction (leftward in FIG. 8). The protrusion 63*b* protrudes in a direction approaching the side face 10*f* along the first direction (rightward in FIG. 8). In the present embodiment, since the first region $R_{c1}$ is biased toward the lower face 10*d* side with respect to the center position Lc of the external terminal electrode 60C in the second direction, the protrusions 63*a* and 63*b* of the first region $R_{c1}$ are also biased toward the lower face 10*d* side with respect to the center position Lc of the external terminal electrode 60C in the second direction. Each of the protrusion lengths of the protrusions 63*a* and 63*b* is, for example, 10 μm to 100 μm.

The external terminal electrode 60D is located on the side face 10*e* side of the end face 10*b* and covers a part of the exposed region $R_B$. The external terminal electrode 60D has a substantially rectangular shape when viewed from the end face 10*b* side. Specifically, the external terminal electrode 60D has a rectangular shape having corner portions formed by curves (that is, having rounded corners). The outer shape of the external terminal electrode 60D does not have a sharp corner. More specifically, similarly to the external terminal electrode 60C, the external terminal electrode 60D includes three regions arranged in the second direction. Each of the three regions has a rectangular shape extending in the first direction. Of the three regions, the first region $R_{d1}$ is located on the exposed region $R_B$. The second region $R_{d2}$ is adjacent to the first region $R_{d1}$ on the upper face 10*c* side. The third region $R_{d3}$ is adjacent to the first region $R_{d1}$ on the lower face 10*d* side. The length of the first region $R_{d1}$ along the first direction (i.e., the width $W_{d1}$ of the first region $R_{d1}$) is longer than the length of the second region $R_{d2}$ along the first direction (i.e., the width $W_{d2}$ of the second region $R_{d2}$). Furthermore, the length $W_{d2}$ of the second region $R_{d2}$ is longer than the length of the third region $R_{d3}$ along the first direction (i.e., the width $W_{d3}$ of the third region $R_{d3}$). The length $W_{d1}$ of the first region $R_{d1}$ is, for example, 500 μm to 600 μm, the length $W_{d2}$ of the second region $R_{d2}$ is, for example, 400 μm to 500 μm, and the length $W_{d3}$ of the third region $R_{d3}$ is, for example, 300 μm to 400 μm.

The first region $R_{d1}$ located on the exposed region $R_B$ is located substantially at the center of the end face 10*b* in the second direction. The second region $R_{d2}$ of the external terminal electrode 60D reaches the edge of the upper face 10*c* in the end face 10*b*. On the other hand, the third region $R_{d3}$ of the external terminal electrode 60D does not reach the edge of the lower face 10*d* in the end face 10*b*, and the lower end of the third region $R_{d3}$ is apart from the edge of the lower face 10*d* along the second direction. Therefore, the height of the second region $R_{d2}$ along the second direction is higher than the height of the third region $R_{d3}$, and the center position Ld of the external terminal electrode 60D in the second direction is located closer to the upper face 10*c* than the center position of the end face 10*b*. In other words, the first region $R_{d1}$ of the external terminal electrode 60D is biased toward the lower face 10*d* side with respect to the center position Ld of the external terminal electrode 60D in the second direction. In the present embodiment, the center position Lc of the external terminal electrode 60C and the center position Ld of the external terminal electrode 60D are at the same height position in the second direction.

As described above, the first region $R_{d1}$ of the external terminal electrode 60D is longer in the first direction than the second region $R_{d2}$ and the third region $R_{d3}$. That is, in the first region $R_{d1}$ of the external terminal electrode 60D, a portion which is not in contact with the second region $R_{d2}$ and the third region $R_{d3}$ configures a pair of protrusions 64*a* and 64*b* which protrude in the first direction compared to the second region $R_{d2}$ and the third region $R_{d3}$. The pair of protrusions 64*a* and 64*b* protrude toward the exposed region $R_B$ of the insulating substrate 30 along the first direction. The pair of protrusions 64*a* and 64*b* protrude oppositely along the first direction. Specifically, the protrusion 64*a* protrudes in a direction approaching the side face 10*f* along the first direction (rightward in FIG. 8). The protrusion 64*b* protrudes in a direction approaching the side face 10*e* along the first direction (leftward in FIG. 8). In the present embodiment, since the first region $R_{d1}$ is biased toward the lower face 10*d* side with respect to the center position Ld of the external terminal electrode 60D in the second direction, the protrusions 64*a* and 64*b* of the first region $R_{d1}$ are also biased toward the lower face 10*d* side with respect to the center position Ld of the external terminal electrode 60D in the second direction. In addition, the protrusion 64*a* of the external terminal electrode 60D and the protrusion 63*a* of the external terminal electrode 60C face each other in the exposed region $R_B$ of the end face 10*b*. Specifically, the protrusion 64*a* of the external terminal electrode 60D protrudes in the exposed region $R_B$ so as to approach the external terminal electrode 60C. The protrusion 63*a* of the external terminal electrode 60C protrudes in the exposed region $R_B$ so as to approach the external terminal electrode 60D. Each of the protrusion lengths of the protrusions 64*a* and 64*b* is, for example, 10 μm to 100 μm.

The cross section of the end faces 10*a* and 10*b* will be described with reference to FIG. 9. Since the cross section of the end face 10*b* is identical or similar to the cross section of the end face 10*a*, the description thereof is omitted.

Figure 9:
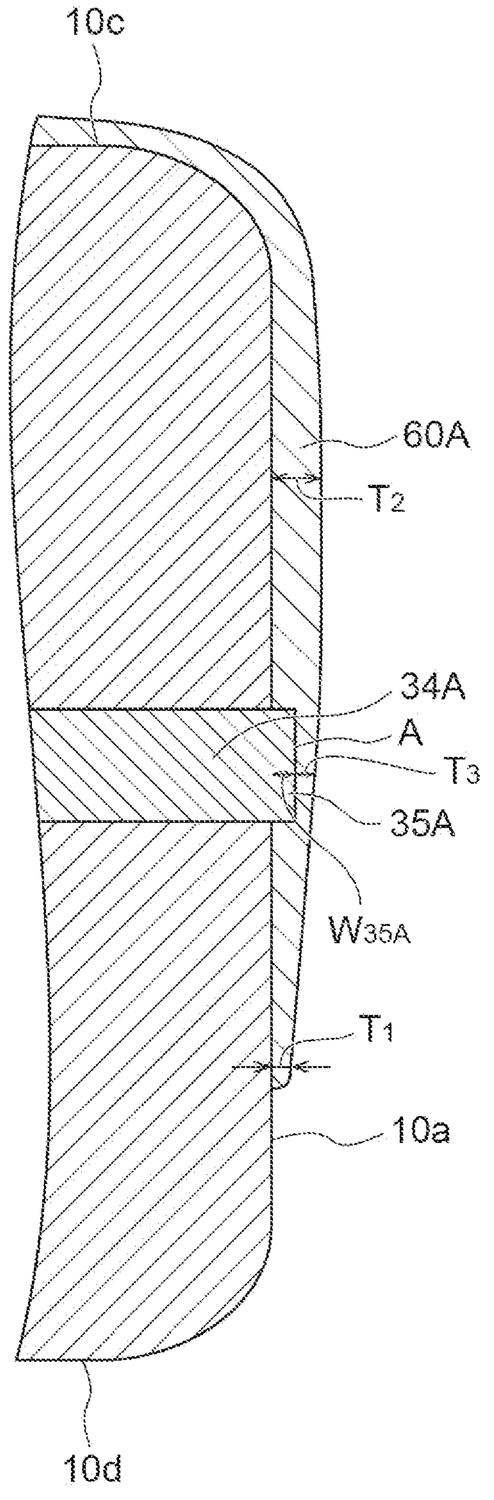
FIG. 9 is a cross-sectional view taken along line IX-IX of FIG. 7.

As shown in FIG. 9, the end face 10*a* is provided with a protruding portion 35A where the frame portion 34A of the insulating substrate 30 protrudes from the end face 10*a*. The protruding portion 35A has a protrusion length $W_{35A}$ of, for example, 10 μm to 30 μm. That is, a portion of the insulating substrate 30 corresponding to the first region $R_{a1}$ among the three regions $R_{a1}$, $R_{a2}$, and $R_{a3}$ protrudes. The thickness of the external terminal electrode 60A is not uniform with reference to the end face 10*a*, and is different in each of the three regions $R_{a1}$, $R_{a2}$, and $R_{a3}$ as shown in FIG. 9. Specifically, the external terminal electrode 60A has a minimum thickness T1 at the lower end of the third region $R_{a3}$ closer to the lower face 10*d* and a maximum thickness T2 near the center of the second region $R_{a2}$ in the second direction. The thickness of the external terminal electrodes 60A monotonically increases from the lower end portion of the third region $R_{a3}$ to the vicinity of the center of the second region $R_{a2}$ and then monotonically decrease to the upper face 10*c*. However, since the exposed region $R_A$ of the frame portion 34A protrudes in a direction orthogonal to the end face 10*a* in the end face 10*a*, the thickness T3 of the external terminal electrodes 60A in the exposed region $R_A$ is reduced by the lengths $W_{35A}$ of the protruding portion 35A. The minimum thickness T1 is, for example, 10 μm, and the maximum thickness T2 is, for example, 40 μm.

The protruding portion 35A of the end face 10*a* is generated by the metal magnetic powder-containing resin 12 in the end face 10*a* receding from the end face 10*a* in manufacturing the element body 10. More specifically, by cutting the plurality of element bodies 10 integrally formed, the element bodies 10 are separated from each other. The end face 10*a* with flat plane is formed as a face generated by the cutting. Then, a surface treatment (including an etching treatment or the like) such as barrel polishing is performed on each element body 10, and the metal magnetic powder-containing resin 12 which is relatively easily polished on the end face 10*a* is polished. By the polishing, a region other than the exposed region $R_A$ in the end face 10*a* retreats in the direction orthogonal to the end face 10*a*, and thus a part of the frame portions 34A and 34B relatively protrudes from the end face 10*a* and becomes the protruding portion 35A. In the end face 10*a*, the roughness of the exposed region $R_A$ after polishing is smaller than the roughness of the magnetic portion 12*a* and the magnetic portion 12*b*.

In the present embodiment, since the contact areas between the external terminal electrode 60A and the element body 10 are increased by the protrusion 61*a* and the protrusion 61*b* of the external terminal electrode 60A, the external terminal electrode 60A and the element body 10 are more firmly attached to each other. Therefore, the attachment strength between the external terminal electrode 60A and the element body 10 can be improved. Similarly, the external terminal electrodes 60B, 60C, and 60D can also improve the attachment strength with the element body 10. As described above, it is possible to prevent the external terminal electrodes 60A, 60B, 60C, and 60D from peeling off from the element body 10.

In addition, in the present embodiment, the external terminal electrodes 60A, 60B, 60C, and 60D have a curved outer shape with no corners. Here, in the case that the outer shape has a sharp corner, when external stresses are applied to the external terminal electrodes 60A, 60B, 60C, and 60D, the external terminal electrodes 60A, 60B, 60C, and 60D are likely to peel off from the corner as a starting point. Therefore, according to the configuration of the present embodiment, it is possible to prevent the external terminal electrodes 60A, 60B, 60C, and 60D from peeling off from the element body 10.

In the present embodiment, the frame portion 34A of the insulating substrate 30 protrudes from the element body 10 at the end face 10*a*. The frame portion 34B of the insulating substrate 30 protrudes from the element body 10 at the end face 10*b*. This increases the face areas of the end faces 10*a* in the protruding portion 35A, thereby increasing the contact areas with the external terminal electrodes 60A, 60B, 60C, and 60D, so that the element body and the external terminal electrode are more firmly brought into contact with each other. Therefore, the attachment strength between the external terminal electrode 60A and the element body 10 can be improved. As described above, it is possible to prevent the external terminal electrodes 60A, 60B, 60C, and 60D from peeling off from the element body 10.

Although the embodiments of the present disclosure have been described above, the present disclosure is not necessarily limited to the above-described embodiments, and various modifications can be made without departing from the scope of the summary of the present disclosure. For example, the number of coils is not limited to two, and may be three or more. The number of external terminal electrodes in each of the end faces 10*a* and 10*b* is not limited to two, and may be one or three or more. The first regions $R_{a1}$, $R_{b1}$, $R_{c1}$, and $R_{d1}$ are offset from the center positions La, Lb, Lc, and Ld of the external terminal electrodes 60A, 60B, 60C, and 60D toward the lower face 10*d*, but may coincide with the center positions La, Lb, Lc, and Ld, or may be offset toward the upper face 10*c*. The upper insulator 50A and the lower insulator 50B are exposed at the end faces 10*a* and 10*b*, but may not be exposed. The center positions La and Lb may be located at the same height or may be located at different heights. The center positions Lc and Ld may be located at the same height or may be located at different heights. In each of the external terminal electrodes 60A, 60B, 60C, and 60D, the number of protrusions is not limited to two and may be one or three or more.

What is claimed is:

1. A coil component comprising:

an element body having a first end face and a second end face that are parallel to each other;

an insulating substrate provided in the element body and exposed at the first end face, the insulating substrate having an exposed region exposed and extending along a first direction at the first end face;

a first coil portion provided on the insulating substrate, the first coil portion having a first end portion exposed at the first end face; and a first external terminal provided on the first end face, covering a part of the exposed region of the insulating substrate and the first end portion of the first coil portion, wherein the first external terminal includes a first protrusion protruding toward the exposed region of the insulating substrate along the first direction, wherein the element body further includes a mounting face orthogonal to the first end face and the second end face, and a top face facing the mounting face, wherein the first external terminal is apart from an edge of the top face at the first end face, wherein the first external terminal includes a plurality of regions arranged in a second direction orthogonal to the first direction at the first end face, wherein the plurality of regions includes a first region having the first protrusion, a second region adjacent to the first region on the mounting face side, and a third region adjacent to the first region on the top face side, and wherein the second region has a length longer than a length of the third region with respect to the first direction.

2. The coil component according to claim 1, wherein the first external terminal includes a pair of the first protrusions, and wherein the pair of the first protrusions protrude oppositely along the first direction.

3. The coil component according to claim 1, wherein the first protrusion is offset from a center position of the first external terminal in a second direction orthogonal to the first direction at the first end face.

4. The coil component according to claim 1, wherein the first external terminal has an outer shape having a corner portion configured by a curved line.

5. The coil component according to claim 1, wherein the insulating substrate includes glass cloth.

6. The coil component according to claim 1, wherein the insulating substrate in the exposed region has a surface roughness smaller than a surface roughness of the first end face of the element body.

7. The coil component according to claim 1, wherein the element body further includes a pair of magnetic layers, the insulating substrate being sandwiched between the pair of magnetic layers in a second direction orthogonal to the first direction at the first end face, and wherein the insulating substrate has a thickness thinner than a thickness of the magnetic layer with regard to the second direction.

8. The coil component according to claim 1, wherein the element body is composed of a metal magnetic powder-containing resin.

9. The coil component according to claim 1, wherein the insulating substrate protrudes from the element body at the first end face.

10. The coil component according to claim 1, further comprising:

a second coil portion provided on the insulating substrate, having a second end portion exposed at the first end face; and a second external terminal provided on the first end face adjacent to the first external terminal in the first direction, covering a part of the exposed region of the insulating substrate and the second end portion of the second coil portion, wherein the second external terminal includes a second protrusion protruding toward the exposed region of the insulating substrate along the first direction, and wherein the first protrusion of the first external terminal and the second protrusion of the second external terminal are opposed to each other at the first end face.

* * * * *